United States Patent
Ebata et al.

(10) Patent No.: US 8,432,311 B2
(45) Date of Patent: Apr. 30, 2013

(54) GPS SIGNAL TRANSMITTER AND SIGNAL TRANSMISSION METHOD THEREOF

(75) Inventors: Tomoichi Ebata, Machida (JP);
Takayoshi Fujioka, Yokohama (JP);
Takamasa Kawaguchi, Yokohama (JP);
Shinya Yoshihara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 290 days.

(21) Appl. No.: 12/650,667

(22) Filed: Dec. 31, 2009

(65) Prior Publication Data

US 2010/0194636 A1    Aug. 5, 2010

(30) Foreign Application Priority Data

Feb. 3, 2009    (JP) .................................. 2009-022113

(51) Int. Cl.
*G01S 19/11*    (2010.01)
(52) U.S. Cl.
USPC ...................................... 342/357.48; 342/386
(58) Field of Classification Search .......... 342/385–386, 342/357.48, 357, 295; 375/146, 298
See application file for complete search history.

(56) References Cited

U.S. PATENT DOCUMENTS 6,512,799 B2 *   1/2003   Al-Khatib ..................... 375/261

FOREIGN PATENT DOCUMENTS

JP      10-48317 A       2/1998
JP    2007-278756 A     10/2007

OTHER PUBLICATIONS

Quasi-Zenith Satellite System Navigation Service, Interface Specification for QZSS (IS-QZSS), Japan Aerospace Exploration Agency, Jun. 17, 2008.
P. Zarchan et al., Global Positioning System: Theory and Applications vol. 1, Progress in Astronautics and Aeronautics, 1995, pp. 86-91 & 208-215, vol. 163, American Institute of Aeronautics and Astronautics, Inc.

* cited by examiner

*Primary Examiner* — Jack W Keith
*Assistant Examiner* — Nga X Nguyen
(74) *Attorney, Agent, or Firm* — Mattingly & Malur, PC (57) ABSTRACT

A GPS signal transmitter configured with a reduced number of components and achieving low cost, space saving, and low power is provided. A GPS signal transmitter of the present invention includes: a crystal oscillator; a carrier wave generator that outputs a first carrier wave and a second carrier wave whose phase is inverted to the phase of the first carrier wave, using a clock output by the crystal oscillator; a microcomputer that is driven with the clock output by the crystal oscillator and outputs a control signal based on a C/A code which is a pseudo random code; a switch that switches over between the first carrier wave and the second carrier wave according to the control signal from the microcomputer and generates a modulation wave; and an antenna that transmits the modulation wave by radio.

14 Claims, 8 Drawing Sheets

PRIOR ART

| | 1023 BITS |
|---|---|
| PSEUDO RANDAM CODE | [0111....100] |

SEQUENCE A  [0111....100] [0111....100] [0111....100] [0111....100] [0111....100] [0111....100] [0111....100]

SEQUENCE B  [0111....100] [0111....100] [0111....100] [1000....011] [1000....011] [1000....011] [1000....011]

SEQUENCE C  [1000....011] [1000....011] [0111....100] [0111....100] [1000....011] [0111....100] [0111....100]

SEQUENCE D  [1000....011] [1000....011] [1000....011] [0111....100] [1000....011] [0111....100] [1000....011]

FIG. 10

GPS SIGNAL TRANSMITTER AND SIGNAL TRANSMISSION METHOD THEREOF

CLAIM OF PRIORITY

The present invention claims priority from Japanese patent application JP 2009-022113 filed on Feb. 3, 2009, the content of which is hereby incorporated by reference into this application.

BACKGROUND OF THE INVENTION

The present invention relates to a GPS signal transmitter and a signal transmission method thereof and, particularly, to a GPS signal transmitter located in a space where radio waves from satellites are not receivable and a signal transmission method thereof.

A GPS (Global Positioning System) is often used to acquire location information. The GPS is one of positioning systems utilizing PGS satellites. In the GPS, a receiver receives positioning signals including time information from GPS satellites orbiting the earth at an altitude of about 20,000 kilometers and is able to know its location (in terms of latitude, longitude, and altitude) on the earth by calculation from the received positioning signals. The GPS is the system developed in USA.

Positioning systems utilizing GPS satellites are generally called GNSSs (Global Navigation Satellite Systems). Among GNSSs, besides the GPS that is currently operating, some positioning systems are expected to operate in future, such as GLONASS in Russian Federation, Galileo in European Union, and a Quasi-zenith Satellite System in Japan. In this specification, satellite positioning systems are generically referred to as GPS.

For positioning by GPS, it is necessary to receive time information transmitted from a GPS satellite. Therefore, if a receiver is located in environments such as in a tunnel, underground, and in-premises spaces where a receiver cannot receive a signal including time information with a required intensity (hereinafter, a term "in-premises" is used to refer to such environments), the receiver is not able to acquire location information with a required accuracy.

Japanese Patent Application Laid-Open Publication No. 2007-278756 discloses a method for providing location information in in-premises space where positioning signals from GPS satellites are not receivable. In Japanese Patent Application Laid-Open Publication No. 2007-278756, specifically, a device located in premises to transmit a signal compliant with a GPS navigation message (this device will be a GPS signal transmitter hereinafter) transmits location information to a device capable of receiving a GPS signal (the latter device will be referred to as a GPS signal receiver hereinafter). The GPS signal receiver identifies its location by acquiring the GPS signal transmitter's location information.

Another location technique in premises is disclosed in Japanese Patent Application Laid-Open Publication No. H10-48317. In this technique, fixed receiving stations transmit data received from GPS satellites and their location information in space inside premises. A user mobile terminal receives the thus transmitted data from the GPS satellites, calculates distances from the GPS satellites via the fixed receiving stations, and calculates distances between the GPS satellites and the fixed receiving stations, based on the fixed stations' location information received and the positions of the GPS satellites. From these results, the user mobile terminal calculates the distances from each fixed receiving station and determines its location.

"User Interface Specifications of Quasi-zenith Satellite System" (available on the Internet at <URL:http://qzss.jaxa.jp/is-qzss/IS-QZSS_10_J.pdf>) specifies the transmission scheme, format, signal output, etc. of a terrestrial complementary signals (IMES (Indoor Messaging System) signal); it is assumed in Japanese Patent Application Laid-Open Publication No. 2007-278756 that the GPS signal transmitter transmits this signal.

SUMMARY OF THE INVENTION

The transmitter device based on the technique described in Japanese Patent Application Laid-Open Publication No. 2007-278756 enables providing location information in in-premises space.

However, the transmitter device is comprised of a number of components and separated into a digital processing block and an analog processing block. Moreover, the device requires a plurality of clocks. Because of its complicated structure, the device must have a rather large size.

In addition, overall, this transmitter device cannot be operated without using components with quite a high precision. This poses a problem that, as most of these individual components are expensive, the production cost in aggregate is high, and the device has large power consumption.

Only a single transmitter can be implemented with a single device and installation and maintenance costs are high. These programs could be factors of deterring the development of in-premises positioning service.

The system described in Japanese Patent Application Laid-Open Publication No. H10-48317 requires a plurality of devices and these devices have to be installed on a large scale. Moreover, there is a need for cabling to draw information from satellites observed outside into in-premises space and the installation cost for the cabling is not negligible. Transmitters need to work together exactly to transmit information synchronously and receivers have to be modified to well receive transmissions from the transmitters. This system is supposed to encounter many difficulties in its feasibility.

The present invention has been made in view of these problems as noted above and is intended to provide a technique allowing for low cost, power saving, and down sizing.

A typical example of the present invention is outlined as below.

A GPS signal transmitter of the present invention includes: a crystal oscillator; a carrier wave generator that outputs a first carrier wave and a second carrier wave whose phase is inverted to the phase of the first carrier wave, using a clock output by the crystal oscillator; a microcomputer that is driven with the clock output by the crystal oscillator and outputs a control signal based on a C/A code which is a pseudo random code; a switch that switches over between the first carrier wave and the second carrier wave according to the control signal from the microcomputer and generates a modulation wave; and an antenna that transmits the modulation wave by radio.

According to the present invention, it is possible to provide a technique allowing for low cost, power saving, and down sizing.

These and other features, objects, and advantages of the present invention will become more apparent from the following description when taken in conjunction with the accompanying drawings.

BRIEF DESCRIPTION OF THE DRAWINGS

Embodiments of the present invention will be described in detail based on the following figures, wherein.

DESCRIPTION OF THE EMBODIMENTS

Embodiments of the present invention will be described hereinafter.

(1) First Embodiment

Figure 1:
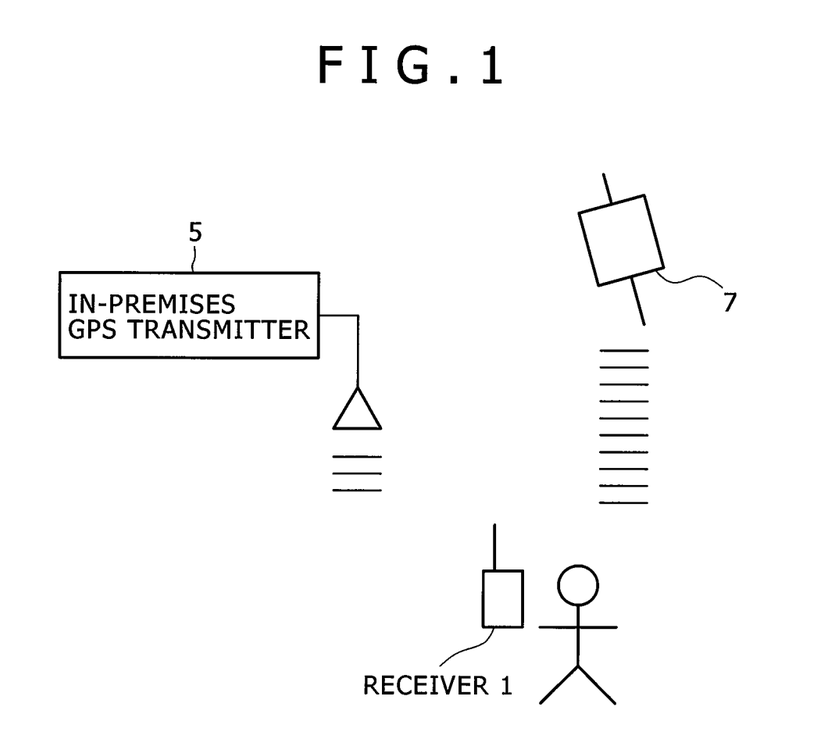
FIG. 1 is a diagram showing a location information system utilizing a GPS signal transmitter in an embodiment of the present invention.

FIG. 1 is a diagram showing a location information system utilizing a GPS signal transmitter which is an embodiment of the present invention. The system includes one or more GPS signal transmitter 5 that transmits location information and a GPS signal receiver 1 (e.g., a GPS-compliant mobile terminal) that receives the information. It is assumed that the GPS signal receiver 1 is capable of receiving radio waves from an ordinary GPS satellite 7.

Figure 2:
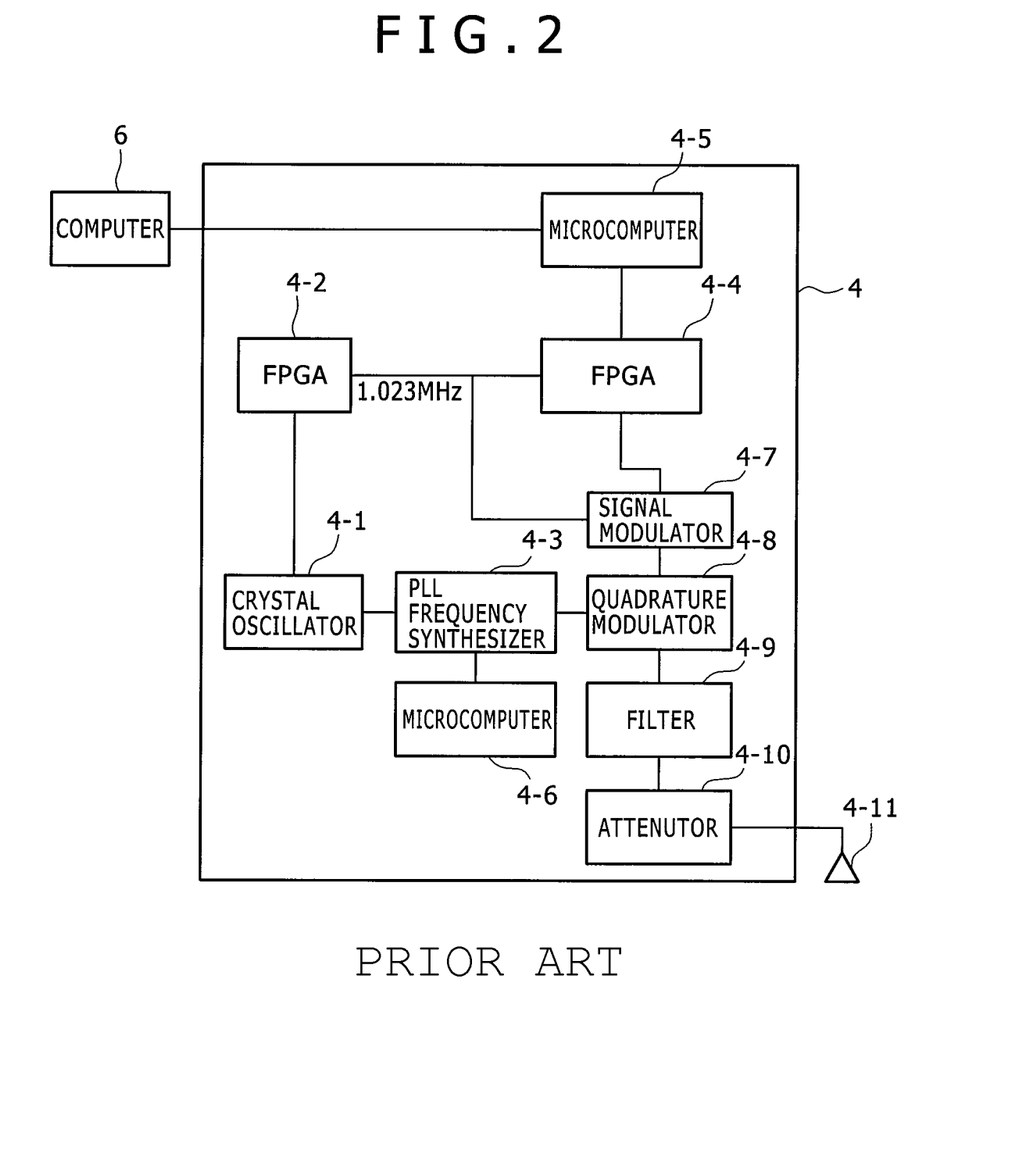
FIG. 2 is a diagram showing the hardware structure of a conventional GPS signal transmitter.

FIG. 2 is a diagram showing the hardware structure of a conventional GPS signal transmitter, which is a comparison example to which the present embodiment is compared.

A crystal oscillator 4-1 supplies a reference clock (10 MHz) to an FPGA 4-2 and a PLL frequency synthesizer 4-3.

The FPGA 4-2 generates a sync signal to drive an FPGA 4-4, using the clock received from the crystal oscillator 4-1. FPGA stands for "Field Programmable Gate Array" which refers to a programmable device in which the user can create a digital logic circuit by defining inputs and outputs.

The FPGA 4-4 generates a navigation message and a C/A code (pseudo random noise code), according to a control command received from a microcomputer 4-5.

Here, the navigation message refers to a message including information from a GPS satellite 7. Any GPS signal receiver 1 must know this information to perform positioning calculation. On the other hand, the C/A code is a digital code sequence in which digits of 0 and 1, called a pseudo noise code, appear to be sequenced irregularly. This code is used as data for identification, assigned to each GPS satellite 7, and is also used as means for identifying a GPS satellite. According to this identifier, the GPS signal receiver 1 creates a given pseudo noise code internally, compares it with a received waveform, finds a desired satellite, and receives the signal therefrom. These topics are detailed in "GPS—Theory and Application", pp. 87-88 (ISBN: 4431711589 written by Bernhard Hofmann-Wellenhof, James Collins, Herbert Lichtenegger).

The PLL frequency synthesizer 4-3 in conjunction with a microcomputer 4-6 having control functions such as a program counter generates a sine wave of 1.57542 GHz which is a carrier wave for GPS radio waves. Detailed description about a navigation message and its format for in-premises GPS use is found in the above-mentioned "User Interface Specifications of Quasi-zenith Satellite System".

A signal modulator 4-7 performs analog modulation of bit information sent in time series from the FPGA 4-4 and its output is further modulated by a quadrature modulator 4-8 which performs a Binary Phase Shift Keying modulation (hereinafter abbreviated to BPSK modulation) which is a modulation scheme for GPS radio waves.

A signal output from the quadrature modulator 4-8 is filtered by a filter 4-9 for eliminating noise components. Finally, the transmission output level of the signal is attenuated by an attenuator 4-10 to a similar level of GPS radio waves that are received terrestrially and then the signal is transmitted from an antenna 4-11.

A computer 6 directs the microcomputer 4-5 and configures a C/A code to be generated by the microcomputer 4-5 and a message to be transmitted.

The transmitter device presented in FIG. 2 includes a number of components and is separated into a digital processing block and an analog processing block. Moreover, the device requires a plurality of clocks. Because of its complicated structure, the device must have a rather large size. Overall, this transmitter device cannot be operated without using components with quite a high precision. This poses a problem that, as most of these individual components are expensive, the production cost in aggregate is high, and the device has large power consumption. Furthermore, only a single transmitter can be implemented with a single device and installation and maintenance costs are high.

Figure 3:
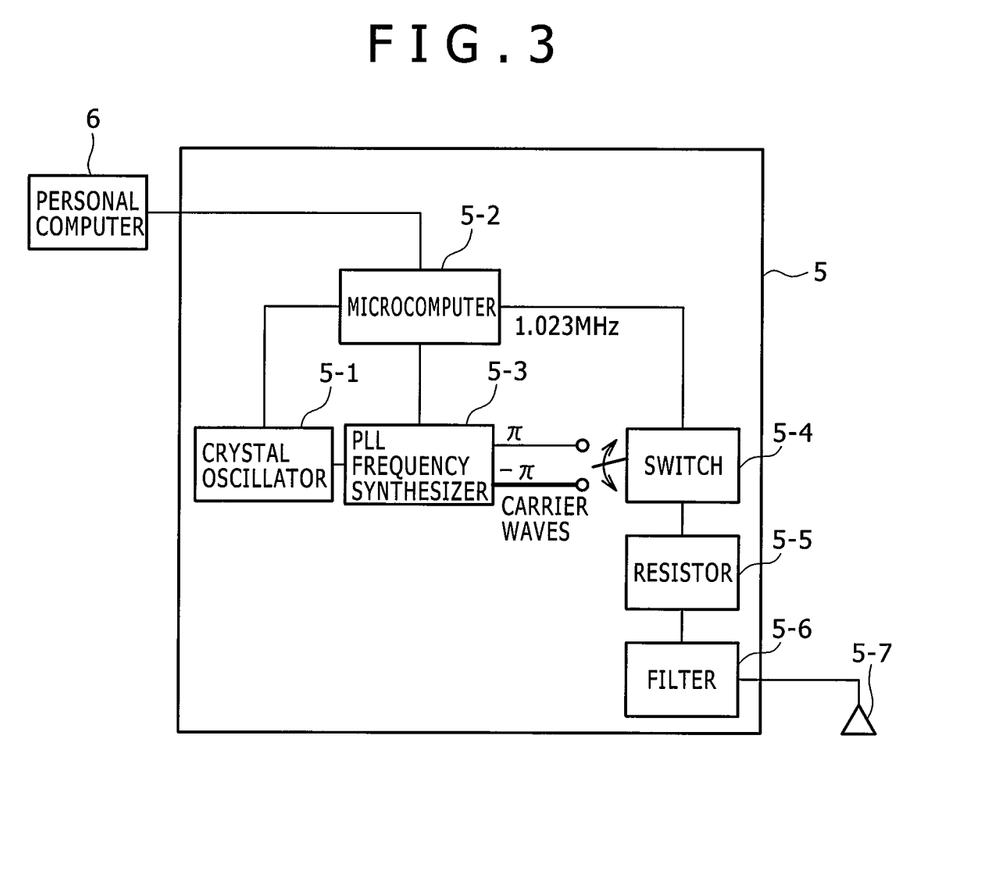
FIG. 3 is a diagram showing the hardware structure of a GPS signal transmitter in an embodiment of the present invention.

In contrast to FIG. 2, FIG. 3 is a diagram showing the hardware structure of a GPS signal transmitter pertaining to the present embodiment.

A crystal oscillator 5-1 is a 16.368 MHz crystal oscillator and a microcomputer 5-2 operates with a sync signal from the crystal oscillator. The reason that 16.368 MHz is used in the GPS signal transmitter of the present invention is due to that a small-sized oscillator with a high precision is available at a low price, as oscillators of 16.367 MHz and 32.736 MHz are very common for GPS use, and that, however, some microcomputers do not operate at 32.736 MHz because operation at this frequency may exceed performance limitation.

A PLL frequency synthesizer 5-3 generates a sine wave of 1.57542 GHz which is a carrier wave for GPS radio waves, as is the case for the conventional transmitter shown in FIG. 2, and a reverse-phase sine wave. The PLL frequency synthesizer 5-3 first generates a 511.5 kHz sine wave by dividing the output frequency from the 16.368 MHz crystal oscillator by ⅟₃₂. After that, using a value of frequency division of a PLL feedback, which is set to ⅟₃₀₈₀, it multiples the 511.5 kHz sine wave by 3080, thus generating a target carrier wave and its reverse-phase carrier wave at the same time.

A switch 5-4 receives bit signals sent from the microcomputer 5-2 via a serial interface and implements BPSK modulation by switching over of the switch.

One method of serial interfacing to carry out this is to use an SPI (Serial Peripheral Interface). The SPI is one kind of serial interface and can be used as a bus connection. The SPI bus provides a synchronous serial communication using three signal lines: SCK (serial clock) and unidirectional SDI and SDO (not including GND). A plurality of slaves can be connected to the bus. To identify each slave, the master must select one of the slaves with an SS (slave select) signal. The SPI bus has a merit of allowing for high-speed communication, because the format and principle of data are simple.

In the present embodiment, BPSK modulation is implemented by a switchover of the switch at a rate of 1.023 MHz corresponding to the timing of inverting the phase of the carrier wave. Here, 1.023 MHz is a rate of one-sixteenth of 16.368 MHz of the crystal oscillator. This switchover takes advantage of the fact that the SPI behaves in sync with the crystal oscillator.

Furthermore, after the signal output is attenuated by using a resistor 5-5 and then noise components are eliminated by a filter 5-6, the signal is transmitted as GPS radio waves from an antenna 5-7. From the antenna 5-7, a signal indicating the location of the GPS transmitter or the location of the antenna is transmitted. The signal to be transmitted is transmitted by a format described in "User Interface Specifications of Quasi-zenith Satellite System". A GPS signal receiver having received the signal transmitted from this GPS signal transmitter has a device configuration for extracting information indicating the location of the GPS signal transmitter or the antenna from the received signal.

The resistor 5-5 may be configured as a T-type or π-type attenuator. By controlling a variable resistor that can be controlled with a voltage value by applying an analog voltage to it via a D/A conversion terminal of the microcomputer 5-2, that is, by provision of a variable attenuator whose resistance value can be varied in this way, aerial power may be controlled by the microcomputer 5-2.

The filter 5-6 may be a Surface Acoustic Wave Filter (hereinafter referred to as a SAW filter) which is favorable, as the SAW filter is mass-produced, less costly, and stably available. The SAW filter is also favorable, as the filter with a very narrow band is feasible. According to the method of the present embodiment, due to switchover between two carrier waves having different phases by the switch 5-4, a sharp phase difference occurs and the carrier waves are not continuous. Because of this, there is a problem that band expansion occurs and out-of-band noise is produced, resulting in energy dispersion. By using the SAW filter capable of providing rapid attenuation outside the band, radiation outside the band is reduced. However, any type of filter may be employed, if it can attain the same purpose as described above.

The computer 6 serves in the same way as described with regard to FIG. 2.

By thus configuring the transmitter, two FPGAs, a CPU, a signal modulator, and a quadrature modulator are dispensed with and this way of transmitter configuration contributes to low cost, down sizing, and power saving. Particularly, analog carrier waves are generated by a single crystal oscillator and, moreover, BPSK modulation is implemented by digital processing, so that the number of components to be installed can be reduced. Specifically, it is achievable to shrink the transmitter size by a factor of about 20, its weight by a factor of about 12, and its power consumption by a factor of about 30.

Figures 4A, 4B:
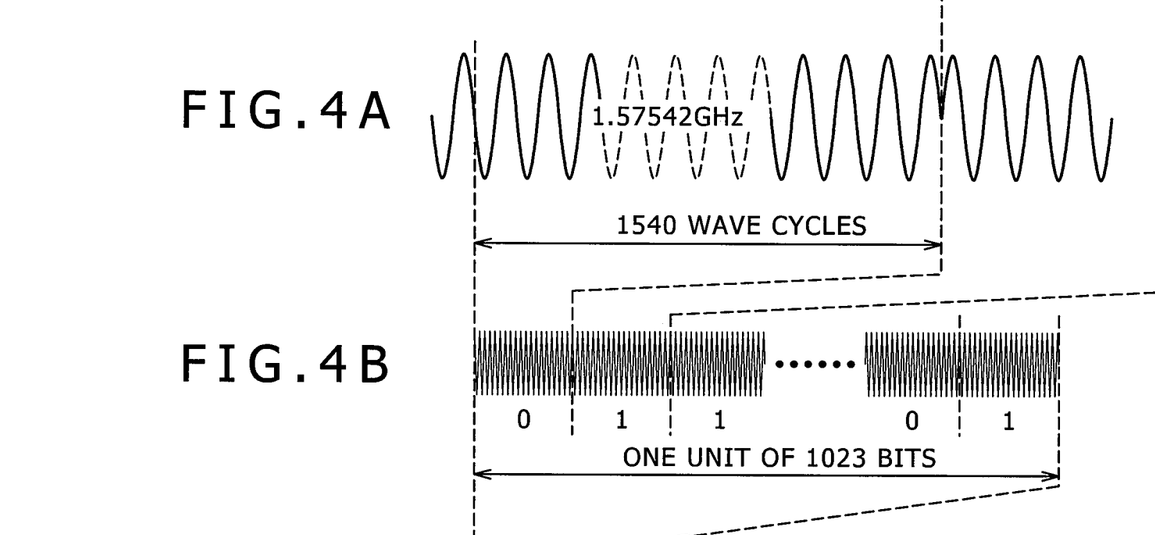
FIGS. 4A to 4C are diagrams to explain the BPSK modulation for GPS in this embodiment.
Figure 4C:
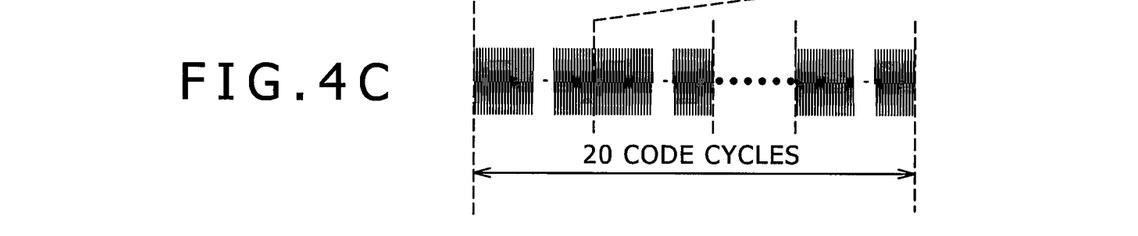

The BPSK modulation for GPS in this embodiment is explained, using FIGS. 4A to 4C. The phase of a 1.57542 GHz carrier wave is inverted every 1540 wave cycles (about one microsecond), according to C/A code content of 0 or 1 (FIG. 4A). This phase inversion is performed by the switch 5-4 in FIG. 3. This represents bit information (FIG. 4 B). After the carrier wave signal bearing this information is output from the switch 5-4, it is attenuated to a predetermined power level by the resistor 5-5, filtered by the filter 5-6 for eliminating noise components, and transmitted from the antenna 5-7. Each time the GPS signal receiver 1 continuously receives carrier wave signals as shown in FIG. 4B for 20 code cycles, it obtains one bit of coded signal information (FIG. 4C).

Figure 5:
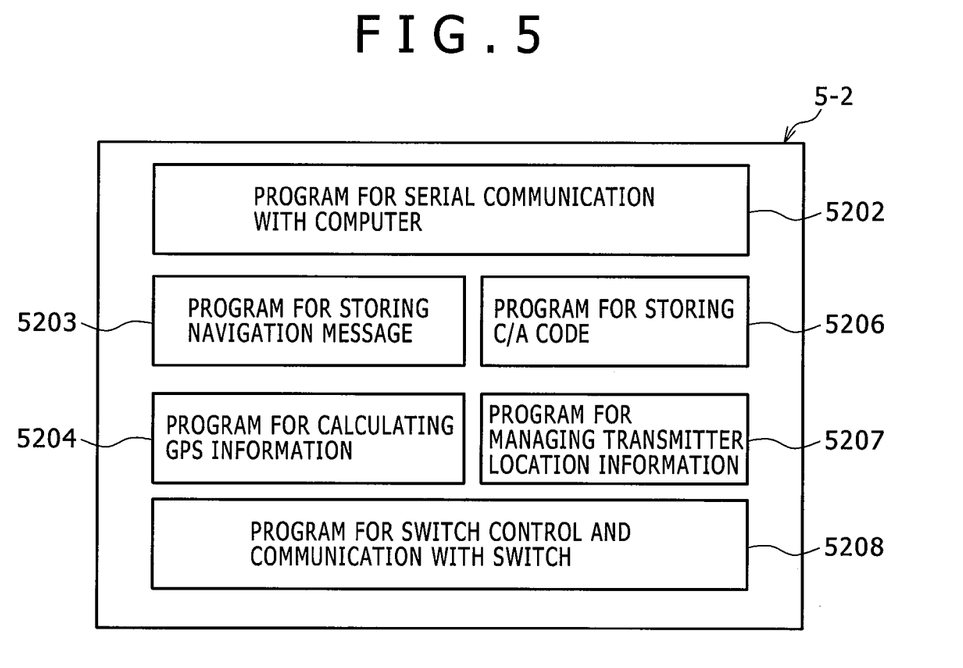
FIG. 5 is a diagram showing a structure of software that is stored in a microcomputer of the GPS signal transmitter in an embodiment of the present invention.

FIG. 5 is a diagram showing a structure of software that is stored in the microcomputer 5-2 of the GPS signal transmitter 5 of the present embodiment. A program 5204 for calculating GPS information is a program that calculates GPS orbit information and the like in the present embodiment, as will be described later. A program 5207 for managing transmitter location information is a program that stores and manages information relevant to the location of the GPS signal transmitter or its antenna or the location from where GPS signal is provided by the transmitter or its antenna.

A program 5202 for serial communication with computer causes the transmitter to connect to an external computer and obtain a navigation message and a C/A code. A program 5203 for storing navigation message causes the transmitter to store a navigation message obtained via the above communication program into the RAM of the microcomputer 5-2. A program 5206 for storing C/A code causes the transmitter to store a pseudo random code consisting of 1024 bits allocated to a PRN number into the RAM. A program 5208 for switch control and communication with switch causes the transmitter to perform AND operation (logical multiplication) on information stored in the above RAM and transfer a result of the operation to the switch 5-4 in real time.

Figure 6A:
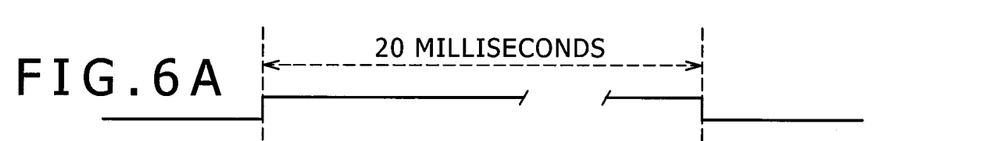
FIGS. 6A to 6C are conceptual diagrams representing an arithmetic operation necessary for the BPSK modulation for GPS.
Figure 6B:
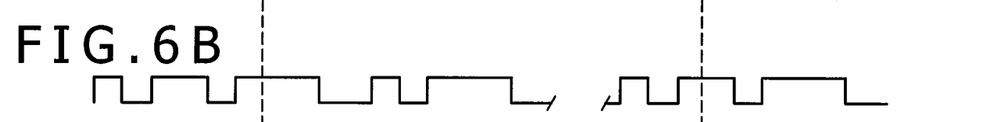
Figure 6C:
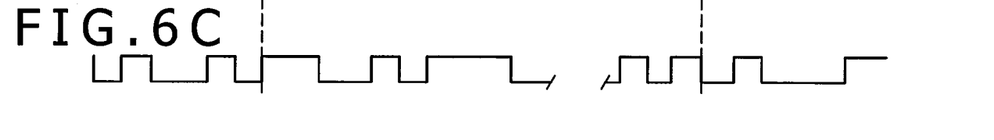

FIGS. 6A to 6C are conceptual diagrams representing an aspect of this arithmetic operation.

FIG. 6A shows a sequence of navigation message information. For example, a value of "5" which is used in a navigation message can be represented as a bit string of "101". This information is recognized by the GPS signal receiver 1 in order of 1, 0, and 1 in units of 20 milliseconds.

FIG. 6B shows a sequence of C/A code information. A C/A code is a sequence of information consisting of 1024 bits of digits 1 and 0 and this code appears repeatedly every one millisecond. Hence, 20 cycles of iteration of same C/A code occur during 20 milliseconds (similar to FIG. 4C).

The program 5208 for switch control and communication with switch causes the transmitter to calculate an exclusive OR (hereinafter referred to as XOR) of the navigation message information as shown in FIG. 6A and the C/A code information as shown in FIG. 6B and transfer its result to the switch 5-4. According to the above result which is 1 or 0, the switch switches over between two carrier waves having mutually inverse phases and yields a target radio wave.

According to the above-described method, there occurs a need to perform a bit shift or an XOR operation at timing of 1.023 MHz. This may impose an overload on the CPU of the microcomputer 5-2. Such overload may result in bit missing in bit information to be provided as a control signal and corrupt a navigation message. Thus, the program 5208 for switch control and communication with switch causes the transmitter to perform processing as will be described below, taking advantage of GPS-specific signal properties, so that the above bit information of 1 and 0 can continue to be output without interruption.

Figure 7:
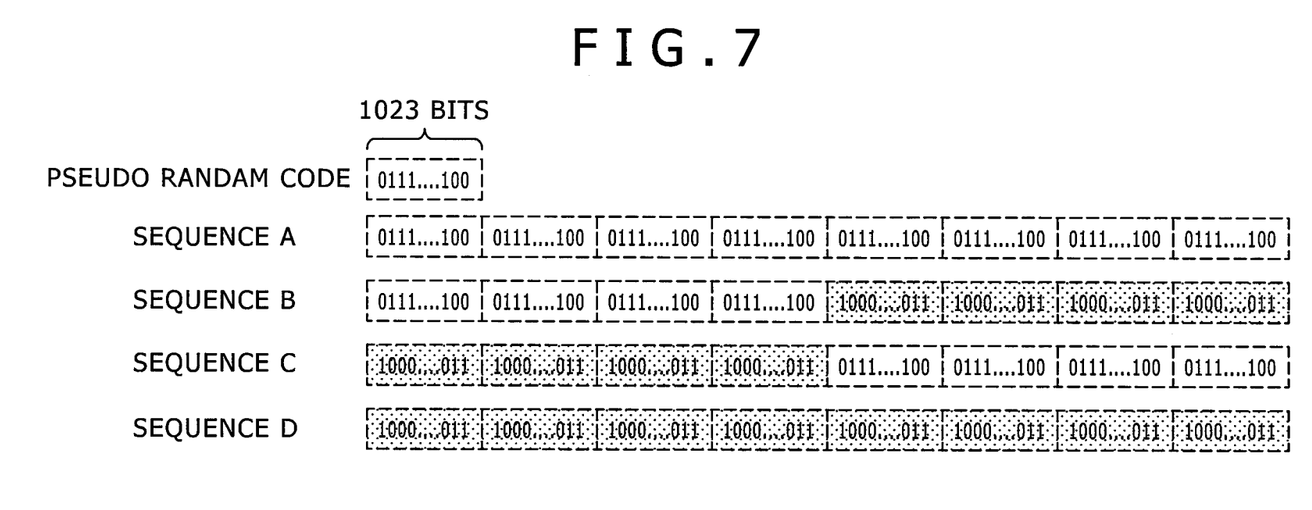
FIG. 7 is a diagram showing data sequences generated from 1023-bit pseudo random codes which are C/A codes representing PRN numbers as GPS satellite numbers.

FIG. 7 is a diagram showing data sequences generated from 1023-bit pseudo random codes which are C/A codes representing PRN numbers as GPS satellite numbers.

The microcomputer 5-2 is supplied with a 16.368 MHz clock from the crystal oscillator 5-1 and the BPSK modulation is implemented by a switchover of the switch at a rate of 1.023 MHz which is supplied to the switch via the SPI bus from the microcomputer 5-2. Therefore, the microcomputer 5-2 needs to continue to output bit information every 16 clock cycles without interruption.

Here, if the microcomputer 5-2 has an UART on an 8-bit (one byte) basis, it is necessary to prepare one byte every 128 clock cycles. The UART is a device for mutual conversion between data to be transmitted in a serial manner and data to be transmitted in a parallel manner.

A control instruction that the microcomputer 5-2 transfers to the switch 5-4 comprises iterative 1023-bit pseudo random codes, wherein whether 1023 bits are transmitted as is (0) or inverted 1023 bits are transmitted (1) is determined every 20 code cycles. As already described, depending on whether or not this inversion occurs, one bit of information of 0 or 1 is represented.

Here, processing as will be described below is performed to reduce the CPU load.

First, from 1023-bit pseudo random codes which are C/A codes representing PRN numbers, the following data sequences are generated and stored beforehand in a storage area of the microcomputer 5-2 as shown in FIG. 7:

(1) Data sequence A consisting of first four cycles representing 0 and last four cycles representing 0,
(2) Data sequence B consisting of first four cycles representing 0 and last four cycles representing 1,
(3) Data sequence C consisting of first four cycles representing 1 and last four cycles representing 0, and
(4) Data sequence D consisting of first four cycles representing 1 and last four cycles representing 1.

Each of the above data sequences consists of 1023 bytes; i.e., 4×1023 bits+4×1023 bits=1023 bytes. By passing the above data sequences to the UART in order, the GPS signal transmitter of the present embodiment generates a predetermined signal. If, for example, 20 code cycles representing 0 and 20 code cycles representing 1 are to be transmitted, it is sufficient to transfer sequences A, A, B, D, and D to the UART in order.

By performing such processing, it is enough for the microcomputer to indicate to the UART which of the sequences A, B, C, and D is to be transmitted at an interval of a given period (as long as 1023×128 clock cycles) without performing bit shift and XOR processing. CPU operation on a clock basis is not required and the CPU load is drastically reduced, thus avoiding corruption of navigation message content due to missing bits and the like.

Another possible method is preparing beforehand all data sequences of a message to be transmitted, instead of the above data sequences. The amount of information for the current data sequences A to D is on the order of about 4 Kbytes, 1023×8×4 bits. Control bit information required for one bit of GPS coded signal is 1023×20 bits (about 2560 bytes). One frame of a navigation message consists of five subframes and one subframe consists of 1500 bits. Hence, the number of bits required as a coded signal is 1500×5 bits. Data size for data sequences required is about 19 Mbytes, 1500×5×1023×20 bits. Such large data size not only wastes resources, but also may exceed the storage capacity of the microcomputer. Therefore, the method of preparing beforehand all data sequences of a message to be transmitted is not practical.

Also, the above method does not make effective use of resources, as the primary computational capability of the microcomputer is not used effectively. Even if an external memory is used, I/O processing might give rise to missing bits.

(2) Second Embodiment

Then, a second embodiment of the present invention is described below. The configuration of the GPS signal transmitter and the functions and operations of its components in the second embodiment are the same as in the first embodiment, unless stated particularly.

Figure 8:
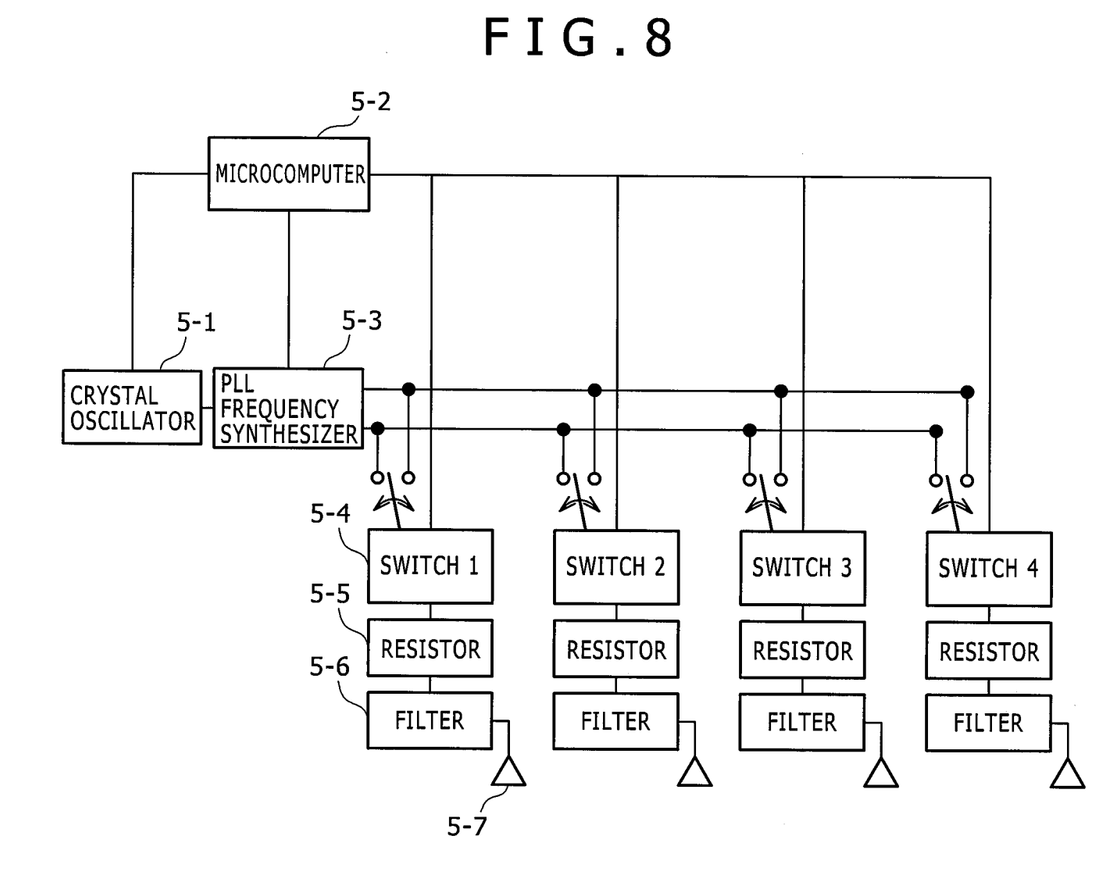
FIG. 8 is a diagram showing hardware for generating a plurality of different in-premises GPS radio waves from a single device.

FIG. 8 is a diagram showing hardware provided with a plurality of switches that receive respective bit control signals via the serial interface of the microcomputer 5-2 to generate a plurality of different in-premises GPS radio waves from a single device.

As compared with the hardware configuration shown in FIG. 3, a radio wave generating section comprised of four switches 5-4, four resistors 5-5, four filters 5-6, and four antennas 5-7 is added in FIG. 8. The PLL frequency synthesizer 5-3 provides two carrier waves having different phases in the same way as in the first embodiment, but a difference lies in that the microcomputer 5-2 provides different bit control signals to the respective switches 5-4.

These control signals contain information for generating signals indicating locations which are provided by the four antennas in FIG. 8. Specifically, these signals contain different PRN numbers and latitude, longitude, and altitude information. For the latitude, longitude, and altitude information, the locations where the antennas 5-7 are located are determined beforehand and information relevant to these locations is transferred to the program 5207 for managing transmitter location information via the computer 6.

The software structure is the same as shown in FIG. 5. However, the program 5203 for storing navigation message and the program 5206 for storing C/A code includes information for controlling the plurality of switches shown in FIG. 8. The program 5208 for switch control and communication with switch provides control of these switches in a parallel manner.

In the second embodiment also, the usage of SPI as in FIG. 3 is described as an example.

The microcomputer 5-2 is the master of SPI and the switches 5-4 are slaves of SPI. The microcomputer 5-2 selects one of the four switches 5-4 to communicate with and carries out predefined control of the switch through the SPI bus consisting of three signal lines. Through such control, it becomes possible to generate a plurality of in-premises GPS transmission signals from a set of GPS carrier waves.

Although four branches to generate radio waves are only presented in FIG. 8, the number of the branches does not have to be limited to four.

The antennas 5-7 are practically extended by antenna cabling and installed in predetermined locations. By way of example, the GPS signal transmitter of the present embodiment may be placed in the center of the ceiling of a floor and the antennas may be installed in predetermined locations by cabling with a plurality of cables from the transmitter.

Figure 9:
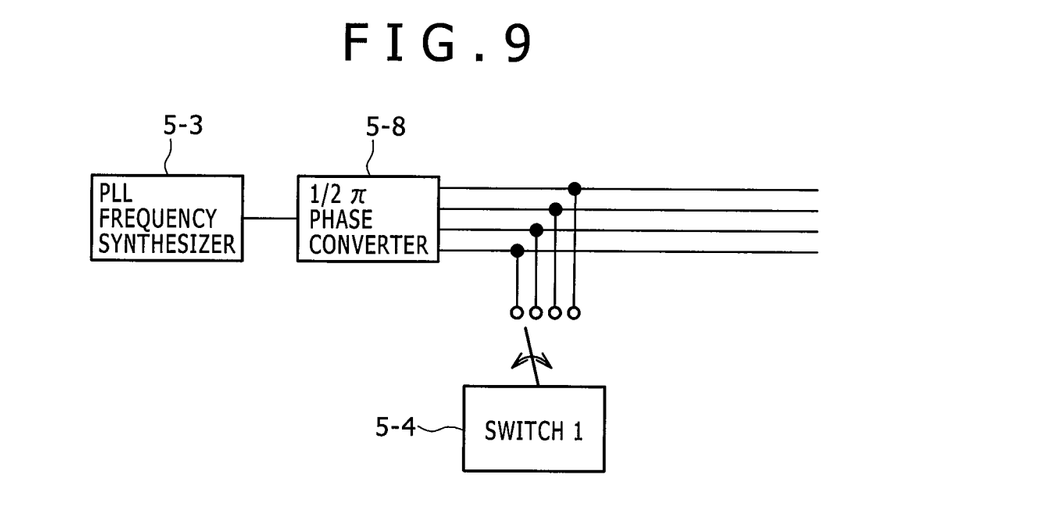
FIG. 9 is a diagram showing a part of the hardware structure of FIG. 8, the part modified to implement QPSK modulation.

FIG. 9 a diagram showing a part of the hardware structure of FIG. 8, the part modified to implement QPSK modulation. At the output side of the PLL frequency synthesizer 5-3, a ½π phase converter 5-8 is installed to generate four carrier waves having a phase difference of ½π. The QPSK modulation can easily be implemented such that the switches 5-4 are switched over to select one of the four carrier waves. The same method can be used for all PSK modulation schemes including 8 PSK modulation. Alternatively, various types of PSK modulation may be yielded from only two carrier waves, i.e., a carrier wave and a ½π phase converted carrier wave.

Because two or more GPS radio waves can be generated by a single GPS signal transmitter, this embedment contributes to device cost reduction, power saving, and space saving.

(3) Third Embodiment

Then, a third embodiment of the present invention is described below. The configuration of the GPS signal transmitter and the functions and operations of its components in the third embodiment are the same as in the first embodiment, unless stated particularly. While the examples where the GPS signal transmitter transmits its location or antenna location(s) have been presented in the first and second embodiments, an example where the GPS signal transmitter transmits signals similar to actual GPS signals transmitted by GPS satellites is discussed in the third embodiment. That is, the GPS signal transmitter transits signals simulating the signals from the GPS satellites in the third embodiment.

A description is provided for a method of implementing a simulative GPS satellite device that provides location information to a GPS signal receiver without modifying the GPS signal receiver, using the same hardware structure as shown in FIG. 8.

The reason why GPS cannot be used in premises is that GPS signal receivers located in premises are not able to receive GPS signals. Therefore, if the same signals as GPS signals receivable outside can be provided at timing when the signals are to be received in in-premises space, even existing GPS signal receivers can acquire location information even in premises.

It is assumed in the first and second embodiments that the GPS signal transmitter is modified so that it can interpret a signal, for example, as described in "User Interface Specifications of Quasi-zenith Satellite System". However, such modification is not assumed in the present method. This is because the transmitter generates GPS radio waves which can, in principle, be acquired outside. Modification allowing the receiver to interpret the signal described in "User Interface Specifications of Quasi-zenith Satellite System" refers to the modification that, in the case where location information for the GPS signal transmitter or its antenna(s) is loaded into a navigation message carried by GPS signal, enables the receiver to interpret the location information. This is not based on the method which will be described below, that is, the method for calculating the location of a receiver 1 by taking advantage of differences among the time instants of arrival of GPS signals transmitted from at least four GPS satellites.

Figure 10:
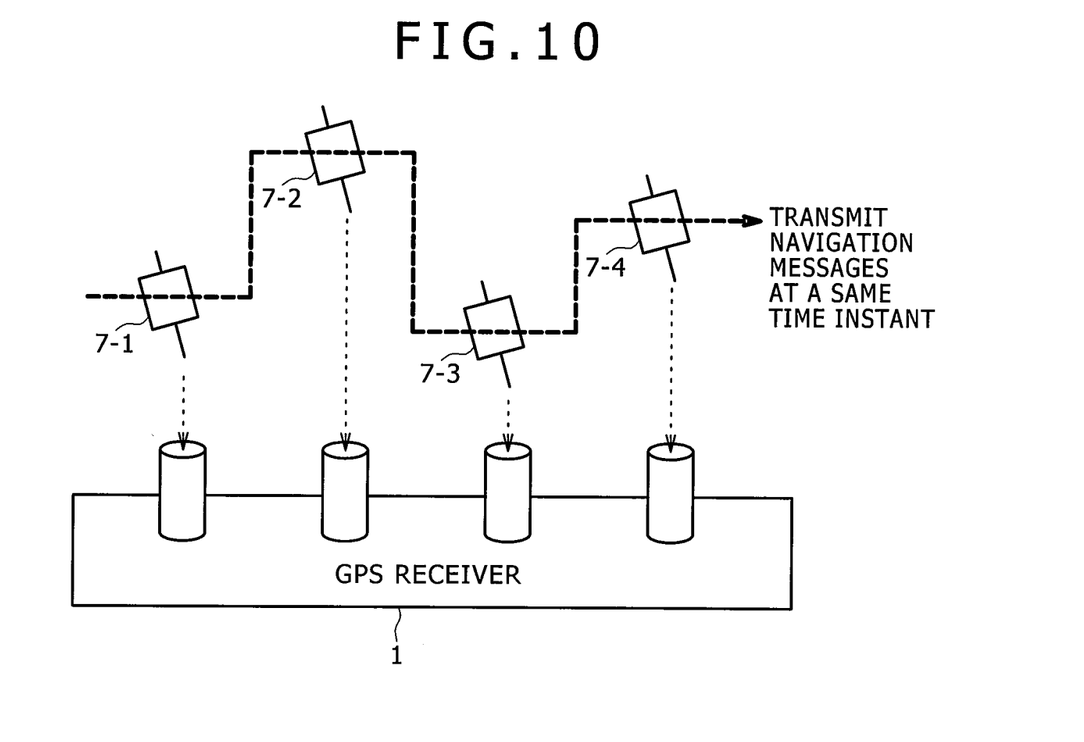
FIG. 10 is a conceptual diagram to explain a method in which a GPS signal receiver acquires its location information, based on navigation messages from GPS satellites.

FIG. 10 is a conceptual diagram to explain the method in which a GPS signal receiver acquires its location information, based on navigation messages form GPS satellites 7.

A GPS signal receiver 1 being on the ground observes the clocks of four GPS satellites 7-1, 7-2, 7-3, 7-4. Each satellite has its clock synchronized with GPS time. However, because the distances from the satellites to the GPS signal transmitter differ, there occur time differences before signal arrival at the transmitter.

Navigation messages which are transmitted by the GPS satellites 7 at a time instant of Ts are assumed to be received at times instants of Ta, Tb, Tc, and Td, respectively. It is also assumed that each GPS satellite 7 exactly knows its coordinates in the cosmic space (in an Earth-Centered, Earth-Fixed (hereinafter abbreviated to ECEF) orthogonal coordinate system).

It is further assumed that a condition that the GPS signal receiver 1 synchronizes with the clocks of the GPS satellites 7 is not satisfied. Hence, values of time differences between Ts and each of Ta, Tb, Tc, an Td multiplied by the velocity of light c cannot exactly represent the distances between the GPS signal receiver 1 and the GPS satellites 7. However, here, given that time lags between arrival time at the GPS signal receiver 1 and transmission time from each of the GPS satellites 7 are $\Delta t$, four unknowns, $\Delta t$ together with the coordinates (ECEF) of the GPS signal receiver 1 can be obtained according to four simultaneous equations, using the values of time differences between Ts and each of Ta, Tb, Tc, an Td multiplied by the velocity of light c.

Accordingly, if the GPS signal receiver 1 can observe time information for at least four GPS satellites 7, the coordinates of the GPS signal receiver 1 can be determined. After the GPS signal receiver 1 have acquired clocks synchronized with the clocks of the GPS satellites 7 by calculating $\Delta t$, the receiver becomes able to do positioning even by receiving GPS signals from three satellites as long as the time lags do not become too large. The ECEF coordinates of the receiver are transformed into latitude, longitude, and altitude information in the GPS signal receiver 1, using approximate equations and the like.

The microcomputer 5-4 generates navigation messages from the four GPS satellites 7 which could be received outside by the GPS signal receiver 1. The principles of the above-describe positioning and/or the contents of navigation messages are detailed in the above-mentioned "GPS— Theory and Application", pp. 89-90 and pp. 209-214.

Here, an explanation is provided for a method for generating the time differences Ta, Tb, Tc, Td of navigation message arrival described with regard to FIG. 10.

Since the velocity of light is 300,000 kilometers a second, precision of transmission timing within on the order of 30 MHz is required to implement the GPS signal transmitter with an error, e.g., within on the order of 10 meters. Therefore, in the present embodiment, assuming the use of a high frequency crystal oscillator 5-1 and a high performance microcomputer 5-2, the SPI operates at a rate of 32.736 MHz. By switchover of the switches 5-4, BPSK modulation is performed and the transmission timing of navigation messages is adjusted at the same time.

As shown in FIG. 8, the transmitter of the present embodiment is equipped with four antennas 5-7 and, therefore, it is, in principle, possible to solve four simultaneous equations.

The microcomputer 5-2 maintains orbit information (ephemeris) for all the GPS satellites 7. The orbits of the GPS satellites 7 are generally represented by an ellipse. To represent a positional relationship between the earth and the plane of an orbit in the cosmic space, the orbit plane is first determined by three parameters, i.e., right ascension of ascending node, orbit inclination, and perigee. Then, the orbit of a satellite is determined by orbit radius, eccentricity, and true anomaly. Although other adjustment parameters, etc. may be added to increase precision, such information may not have to be prepared by the microcomputer 5-2 in the present embodiment. This information will be referred to as simple ephemeris hereinafter.

In the present device, clocks simulating the clocks of the GPS satellites 7 are provided by the microcomputer 5-2 and these clocks do not need to exactly coincide with the actual clocks of the GPS satellites 7. This is because the goal is to provide an in-premises location at a precision within on the order of 10 meters and the GPS signal receiver 1 do not require exact clocks.

While ephemeris information is updated at an interval of a given period of time in actual GPS, such updation may not be carried out in the present device. Exact coordinates information on the GPS satellites 7 is not required and it is considered sufficient that, as a result of transmission by the present device, the device provides proper location information where the device is installed to the GPS signal receiver 1.

As for almanac information as well, it is considered sufficient to provide almanac information to a similar extent to ephemeris so that the microcomputer 5-2 can provide this information. This is because almanac information is not required practically in premises. It is sufficient if the receiving mobile terminal has such information to an extent that, when the user goes outside from an in-premises space, a large difference in information does not occur and the terminal can return to normal positioning outside. This information will be referred to as simple almanac hereinafter.

However, in a case where the microcomputer 5-2 is provided with a communication function, the ephemeris and almanac information may be acquired from outside.

An explanation is provided below for a flow of generating radio waves to be transmitted by the GPS signal transmitter, including a method in which the microcomputer 5-2 generates control data which is provided to the four switches 5-4 and a method calculating timing to provide it.

[Step 1] The program 5204 for calculating GPS information in the GPS signal transmitter reads beforehand location information to be provided by the GPS signal transmitter, stored in the program 5207 for managing transmitter location information, and selects four GPS satellites which could be observed at that time, as if the current location was outside. Criterion for this selection such as to select satellites having a high elevation angle and being distributed over the sky may be used. This is because a proper selection of satellites contributes to positioning precision.

[Step 2] The program 5204 for calculating GPS information calculates the coordinates at which the selected GPS satellites reside in the cosmic space, using simple ephemeris information and calculates the distances from the satellites to the location to be provided by the GPS signal transmitter. Furthermore, by dividing these distances by the velocity of light, this program calculates arrival time of GPS signals which would be transmitted by the GPS satellites.

[Step 3] From the time thus calculated, the foregoing program calculates time instants at which GPS signals would be received from the GPS satellites, as if the current location was outside, and passes the time instants and information relevant to required navigation messages to the program 5208 for switch control and communication with switch.

[Step 4] The program 5208 for switch control and communication with switch generates bit control information composed of the above-mentioned data sequences A to D before the above-specified timing comes and passes the bit control information to the UART at the specified timing.

By repeating processing in the foregoing steps 1 to 4, the GPS signal receiver 1 having received GPS signals from the GPS signal transmitter of the present embodiment can receive location information scheduled to be provided by the GPS signal transmitter as calculation results of the four simultaneous equations.

Considering that GPS signals having C/A codes receivable outside are simulated in premises to be those signals having the same C/A codes, confusion of GPS signals having the same C/A codes may occur at the boundary between an in-premises space and open air. Then, this problem can be solved by modifying the foregoing step 1 as follows.

[Step 1'] The program 5204 for calculating GPS information in the GPS signal transmitter reads beforehand location information to be provided by the GPS signal transmitter, stored in the program 5207 for managing transmitter location information, and selects four GPS satellites which could not be observed at that time, as if the current location was outside. For example, this program selects four GPS satellites which can be observed in a location symmetrical about the earth center with respect to the location to be provided by the GPS signal transmitter. Specifically, if the device is installed in Japan, the program selects GPS satellites which can be observed in Brazil at that time.

Even if such GPS satellites are selected, the GPS signal receiver 1 can position itself based on location information, since GPS is, in principle, capable of positioning all locations about the center of the earth. Because of using GPS signals from the GPS satellites which could not observed outside, no confusion problem occurs.

According to the above-described embodiments of the present invention, it is possible to provide a device that provides location information in in-premises space with a minimum modification to the transmitter or without modification, while the device can achieve low cost, power saving, down sizing, and easy installation and scalability of the device is assured.

With only a single microcomputer serving as a basic primary component, it is possible to generate a plurality of different GPS signals at the same time. Low power consumption can also be realized. Space saving is also be realized. Only by extension of antenna cables, the transmitter having extended functionality comparable to several transmitters can be installed in one floor space. Furthermore, it is possible to provide location information even in premises without modifying the GPS signal receiver.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications within the ambit of the appended claims.

What is claimed is:

1. A GPS signal transmitter comprising:
   a crystal oscillator;
   a carrier wave generator that outputs a first carrier wave for GPS radio waves and a second carrier wave whose phase is inverted to the phase of the first carrier wave, using a clock which is output by the crystal oscillator;
   a microcomputer that is driven with the clock which is output by the crystal oscillator, generates a C/A code which is a pseudo random code and outputs a control signal based on the C/A code;
   a switch that switches over between the first carrier wave and the second carrier wave according to the control signal from the microcomputer and generates a modulation wave; and
   an antenna that transmits the modulation wave by radio.

2. The GPS signal transmitter according to claim 1, wherein, given that the clock frequency of the crystal oscillator is a first frequency and a frequency of switching over between the first carrier wave and the second carrier wave occurs is a second frequency, the first frequency is an integral multiple of the second frequency.

3. The GPS signal transmitter according to claim 1, wherein the clock frequency of the crystal oscillator is 16.368 MHz.

4. The GPS signal transmitter according to claim 1, wherein a frequency of switching to the second carrier wave is an integral multiple of 1.023 MHz.

5. The GPS signal transmitter according to claim 1, wherein the first carrier wave and the second carrier wave are sine waves with a frequency of 1.57542 GHz.

6. The GPS signal transmitter according to claim 1, wherein the modulation wave is generated according to the control signal which is generated at a bit rate of 1.023 MHz.

7. The GPS signal transmitter according to claim 1, wherein the switch carries out a PSK modulation by switching over between the first carrier wave and the second carrier wave.

8. The GPS signal transmitter according to claim 1, further comprising:
   a memory that stores time-series data of control signals for modulating the first carrier wave and the second carrier wave, wherein the modulation wave is generated by using the time-series data stored in the memory.

9. The GPS signal transmitter according to claim 8,
   wherein the time-series data is created from 1023-bit pseudo random codes which are C/A codes representing PRN numbers of GPS satellites, and
   wherein the time-series data comprises a data sequence consisting of first four cycles representing 0 and last four cycles representing 0, a data sequence consisting of first four cycles representing 0 and last four cycles representing 1, a data sequence consisting of first four cycles representing 1 and last four cycles representing 0, and a data sequence consisting of first four cycles representing 1 and last four cycles representing 1.

10. The GPS signal transmitter according to claim 1,
    wherein the antenna transmits the location of the GPS signal transmitter or the location of the antenna.

11. The GPS signal transmitter according to claim 1,
    wherein the antenna transmits simulative GPS signals simulating signals which are transmitted by the GPS satellites.

12. The GPS signal transmitter according to claim 11,
    wherein the GPS signal transmitter is located in a space where radio waves from the GPS satellites are not receivable.

13. The GPS signal transmitter according to claim 11,
    wherein the switch adjusts the transmission timing of the phase converted radio waves.

14. A signal transmission method of a GPS signal transmitter comprising:
    outputting a clock by a crystal oscillator to a carrier wave generator;
    outputting a first carrier wave for GPS radio waves and a second carrier wave whose phase is inverted to the phase of the first carrier wave by the carrier wave generator, using the clock output;
    outputting a control signal based on a C/A code which is a pseudo random code generated by a microcomputer that is driven with the clock which is output by the crystal oscillator;
    switching over between the first carrier wave and the second carrier wave according to the control signal from the microcomputer and generating a modulation wave by a switch; and
    transmitting the modulation wave by radio by an antenna.

* * * * *